United States Patent Office 3,307,906
Patented Mar. 7, 1967

3,307,906
SILICA PIGMENTS AND PREPARATION THEREOF
Oliver W. Burke, Jr., Fort Lauderdale, Fla.
(P.O. Box 1266, Pompano Beach, Fla. 33062)
No Drawing. Filed May 24, 1965, Ser. No. 458,480
12 Claims. (Cl. 23—182)

This invention relates to silica pigment materials and to the preparation thereof from alkali metal silicate, and aims generally to improve the same.

OBJECTS

Particular objects of the present invention, severally and interdependently, are to provide an improved process for the preparation of silica pigments; to provide a process for controlling the relative sizes of the primary particles of colloidal silica and of the aggregates and flocs thereof which form the silica pigment particles, e.g. for the production of improved silica pigment materials; and to provide an improved silica pigment having useful characteristics and at an economical cost.

Other objects and advantages of the invention will be apparent from a consideration of the herein set forth general and specific description of illustrative embodiments thereof.

PRESENT INVENTION—IN GENERAL

The present invention is concerned with the production of silica pigment by the acidulation of alkali metal silicate e.g. sodium silicate, especially with carbon dioxide as acidulating agent, and is characterized by the addition, at certain predetermined stages during the progress of the acidulation, of water essentially free of electrolyte.

The course of the acidulation of sodium silicate solution to precipitate silica therefrom can be classified in several distinct stages. Prior to acidulation, of course, is the preparatory stage in which the sodium silicate is diluted with water and in which the factor $x$ designating the ratio of $SiO_2$ to $Na_2O$ in the sodium silicate formula $Na_2O(SiO_2)_x$ remains unchanged. As a practical matter, in commercial sodium silicate used for the production of precipitated silica, the value of $x$ lies in the range of about 3.0 to 3.4, e.g. 3.22 in the 41° Bé. sodium silicate of commerce.

The *first period* in the acidulation is termed the preprecipitation period, during which the silica of solution is polymerizing to form colloidal particles, that is, the primary silica particles also sometimes called the ultimate silica particles. In this period, no appreciable number of colloidal silica particles have aggregated to form silica network particles. The end of this period is taken to extend to a point at which the $x$ value lies in the range of 4.2 to 5.3 (depending on the conditions present). The present invention aims to provide a method of controlling the size of network particles formed in the second stage in relation to the size of the colloidal particles produced in the first stage.

The *second stage* is termed the incipient precipitation period. This period embraces a region in which the colloidal silica particles aggregate to form network particles, and is detectable by the appearance of Tyndall effect, which usually occurs between $x$ values of 4.2 and 5.3.

The term Tyndall effect is used herein in the same manner as defined in J. Thewlis's Encyclopaedic Dictionary of Physics, Pergamon Press, 1962, in which it is defined as follows:

"*Tyndall effect.*—The scattering of light by very small particles, the scattered light being predominantly blue."

This authority further states that: "This phenomenon and its dependence on the size of the scattering particles was first investigated by Tyndall. The scattered intensity is proportional to the square of the volume of the particle and proportional to $1/\lambda^4$. Thus the scattering for light at the blue end of the spectrum is about ten times as great as for light at the red end."

Under appropriate conditions the appearance of the Tyndall effect may mark the commencement of the second stage. This second or incipient precipitation period continues to the point where precipitation of silica commences and preferably less than 10% of the silica has appeared as precipitate. This incipient precipitation period is deemed to extend from the point at which $x$ has a value of between 4.2 and 5.3 to an $x$ value of about 6.4 or higher (depending on the conditions present). The present invention aims to provide a method of controlling the size of the network particles formed in the second stage independent of the size of the primary particles formed in the first stage.

The *third period* or the principal precipitation period of the acidulation is that period in which the major part of the precipitation of silica occurs and extend from the upper end of the second period when the precipitation of silica is commencing to the point at which the precipitation of silica is substantially complete, which is normally considered to be the point at which about 70% of the stoichiometric quantity of acidulating agent has been added and at which $x$ has a value of about 10 or more (which value may also vary with the conditions present). Depending on the conditions present, the extent of flocculation of the precipitate may vary.

The present invention has disclosed that particular advantage is attained by a process for the precipitation of reinforcing silica pigment by the gradual acidulation of an aqueous solution of alkali metal silicate, especially sodium silicate, with the aid of carbon dioxide, accompanied by a timed addition of water essentially free of electrolyte in an amount in the range of 10 to 150 parts or more per 100 parts of water present just prior to such acidulation, such timed addition being effected after an $x$-value of 3.75 has been reached, and preferably after the appearance of a Tyndall effect in the solution. By this new process the network particle size and/or the size of floc of the silica pigment are established relative to the size of the primary silica particles thereof in a controlled or predetermined manner, thus controlling the characteristics of the pigment produced.

In a first embodiment of the invention the said water essentially free of electrolyte is added to the aqueous solution of sodium silicate during a part of the period in the acidulation thereof after the value of $x$ in the composition of the sodium silicate designated by the formula $$Na_2O(SiO_2)_x$$

has reached 3.75. By this embodiment it is possible to influence in the first stage of acidulation the ultimate or primary particle size of silica pigment produced as well as to influence the size of network particles and the size of floc of the finally precipitated pigment relative thereto.

In a second embodiment of the invention, water essentially free of electrolyte is added after an $x$-value of at least about 4.2 is reached, and preferably only when the Tyndall effect has become evident. By this embodiment it is possible to control the size of the primary particles formed in the first stage essentially either by the control of the concentration and temperature and rate of acidulation of the aqueous sodium silicate solution alone, or with a measured quantity of electrolyte, and to then influence the size of the network particles and the size of floc of the final precipitate in relation to the size of the primary particles.

In the third embodiment of the invention, water essentially free of electrolyte is added after the precipitation of silica pigment has commenced. By this third embodiment it is possible to control the size of the primary particles and the size of the network particles as aforesaid, and to then influence the size of floc of the precipitate relative to both.

In a fourth embodiment of the invention, the procedures of selected ones of the first, second and third embodiments are combined, so as to establish the network particle size and the size of floc of the pigment relative to the size of the primary particles thereof in accordance with the combined procedures.

In short, I have found that by applications of the present invention one can vary the size of the ultimate or primary particles when desired, and can vary relative thereto the size of the network aggregates thereof constituting the pigment particles, and that by other applications of the invention one can vary the size of floc of the pigment relative to the size of the network aggregates or pigment particles themselves, thus to prepare flocs well adapted for dispersion of the silica pigment to the extent required in the situs of use thereof, and which have been found, when incorporated in elastomers, to produce vulcanizates with improved properties, e.g. reduced heat buildup and/or increased tensile properties.

The present invention may be applied in the acidulation of alkali metal silicate solutions having concentrations of alkali metal silicate — designated by the formula $M_2O(SiO_2)_x$ in which M is alkali metal—in the range of about 20 grams per liter to about 200 grams per liter, and being subjected to acidulation at temperatures between the freezing point and boiling point of water, i.e. from about 5° C. to about 100° C. at atmospheric pressure, or up to 200° C. or more if conducted under higher pressures.

After the flocs of precipitated silica pigment have been formed they may be recovered from the mother liquor in any suitable or preferred manner, e.g. by centrifuging, filtering, etc. and the silica pigment material may be removed as wet cake for further use with or without any further after-treatment.

The carbon dioxide gas employed in this invention may be full strength or may be diluted with air or other inert gases, e.g. such as the dilute carbon dioxide gas produced by the combustion of hydrocarbons such as propane or butane.

The rate of introduction of the carbon dioxide gas establishes the rate of acidulation of the sodium silicate and this rate may vary from the maximum rate of absorption of carbon dioxide by the sodium silicate solution to rates one-tenth or even as slow as one-hundredth of this maximum absorption rate. Application Serial No. 422,144, now Patent No. 3,250,594 discloses the advantages of varying the rate of acidulation of sodium silicate with carbon dioxide during certain stages of the acidulation and these procedures can be employed in conjunction with the teachings of this invention.

The process of this invention may be conducted in a batchwise or stepwise manner, or continuously, depending on available equipment. Suitable apparatus, for example, is set forth in copending application Ser. No. 142,668, in which, for example, the present invention can be practiced as a continuous process wherein the acidulation is applied to moieties of the alkali-metal silicate solution in a series of zones, preferably coordinated with the periods of addition or non-addition of other materials, with the addition of the added water effected in one of said zones, or in a number of said zones less than all of said zones, in accordance with the correlations of water additions and acidification of the solution contemplated by the present invention.

In the examples herein, like after-treatments are employed in each of the examples of the respective series set out to exemplify the invention and its advantages, but the particular after-treatments are not claimed herein, and the novel ones thereof are claimed in other applications.

The silica product as wet filter or centrifuge cake may be master-batched with latices of natural or synthetic elastomers and/or plastomers.

The novel features of the invention are set forth in the claims appended hereto, but the practice of the invention itself will be more precisely understood by reference to the following specific examples embodying the same, which are to be considered as illustrative and not restrictive of the invention.

EXAMPLES

*Example 1*

In this example 14,065 grams $(20 \text{ moles } Na_2O/(SiO_2)_{3.22})$ of 41° Bé. commercial sodium silicate was dissolved in 63 liters of water and placed in a stainless steel reactor agitated by a propeller type stirrer. The reactor and sodium silicate solution were heated to 80° C. and so maintained.

Through a tube reaching to the bottom of the reactor carbon dioxide was allowed to flow into the agitated sodium silicate solution at relatively constant rates as set forth in Table I and after 120 minutes 6.7 moles of carbon dioxide has been introduced and the partially acidified sodium silicate solution took on the blue Tyndall effect color. At this 120 minute time 15 liters of water were quickly added (i.e. in less than 1 minute) to dilute the silicate solution and the acidulation with carbon dioxide was continued. Table I herein sets forth the various rates of acidulation with carbon dioxide employed throughout the acidification.

TABLE I.—ACIDULATION RATE

| Time, minutes (Cumulative) | $CO_2$, moles (Cumulative) | Acidification, percent (Cumulative) |
|---|---|---|
| 0 | 0 | 0 |
| 120 | 6.7 | [1] 33.4 |
| 450 | 18.1 | 85.4 |
| 610 | 24.6 | 123.0 |

[1] Tyndall effect noticeable and added 15 liters of 80° C. water

The silica slurry from the reactor was filtered and washed until the soluble salts were less than 1% by weight of the dry solids content.

A 2500 grams sample of the washed silica slurry having a pH of 8.6 was diluted with 1 liter of water and while agitating was treated with 150 ml. of 10% aluminum sulfate with reduced to pH to 4.0. The so treated silica product was filtered and the filter cake weighed 1370 grams after washing with 2 liters of water. The wet silica filter cake was dried at 105° C. and the yield was 235 grams which after micropulverizing was designated silica 1–A.

A further 2500 grams of the washed silica slurry was treated with 70 ml. of 10% sulfuric acid and the pH was 4.0. This acidic silica slurry was filtered and washed with 2 liters of water and yielded 1040 grams of filter cake which on drying at 105° C. and micropulverizing yielded 215 grams of dry silica pigment designated silica 1–B.

*Example 2—(comparative example)*

This silica was prepared exactly like the silica of Example 1 except that the step of adding water in accordance with the present invention was omitted.

The reactor charge thus consisted of 63 liters water and 14.065 g. of 41° Bé. sodium silicate (20 moles $Na_2O/(SiO_2)_{3.22}$), and after these ingredients had been thoroughly mixed and the temperature thereof raised to 80° C. the carbon dioxide feed was started. The carbon dioxide was fed at a substantially constant rate. After 615 minutes in the reaction 23.8 moles of carbon dioxide had been consumed which was equivalent to an acidification of 119%.

As in Example 1, the silica slurry so prepared was filtered and washed until the soluble salt content was below 1% and a 3000 g. portion thereof was treated with 138 ml. of 10% aluminum sulfate and the resulting silica slurry had a pH of 4.0 and the silica product was filtered, washed with 2 liters of water, and the 1700 grams of filter cake dried at 105° C. to yield 255 grams of product which after micropulverizing was designated silica 2-A.

A further 3000 g. portion of the said washed silica was treated with 62 ml. of 10% sulfuric acid until a pH of 4.0 was obtained and the silica product was filtered and washed with 2 liters of water and the resulting 1790 grams of filter cake on drying yielded 264 grams of dry product which after micropulverizing was designated silica 2-B.

*Example 3—(comparative example)*

This silica was prepared like Example 2 except that the sodium silicate solution was made up in 78 liters of water instead of 63 liters of water.

The reactor charge consisted of 14,065 grams of commercial 41° Bé. sodium silicate (20 moles $Na_2O/(SiO_2)_{3.22}$)

and 78 liters of water. After the ingredients were mixed and the temperature raised to 80° C. the carbon dioxide feed was started. The carbon dioxide was fed at substantially constant rate and after 750 minutes the reaction was terminated, 24.8 moles of carbon dioxide having been fed which was equivalent to an acidulation of 124%.

The silica slurry so prepared was filtered and repeatedly washed until the soluble salt content was less than 1% dry silica basis.

As in Example 1, a portion of the washed silica slurry was treated with 10% aluminum sulfate to a pH of 4.5 filtered and washed, dried at 105° C. micropulverized and designated silica 3-A.

Another portion of this silica slurry was treated in exactly the same manner except that 10% sulfuric acid was employed in place of the aluminum sulfate to lower the pH to 4.0. The resulting dry silica product was designated 3-B.

The silicas prepared in Examples 1-3 were each compounded with SBR-1502 in accordance with the compounding recipe given in Table II.

TABLE II

Compound ingredients: Quantities (wt. parts)
Butadient-styrene copolymer (SBR-1502) ____ 100
Silica pigment material _____ 50
Antioxidant, 2,2 - methylene-bis(4-methyl-6-t.-butylphenol) (Antioxidant 2246) _____ 2.0
Triethanolamine _____ 1.0
Paracoumarone - indene resin (Cumar MH 2½) _____ 2.5
Reogen _____ 5.0
Zinc oxide _____ 5.0
Magnesium oxide _____ 4.0
Di-2-benzothiazyl disulphide (Altax) _____ 0.75
N,N'-di-o-tolylguanidine (DOTG) _____ 1.5
Sulfur _____ 2.0

In compounding the stock the selected silica pigment material was milled into the SBR-1502 together with the antioxidant and other compounding ingredients and the stock was aged overnight and then remilled and cured for 120 minutes at 287° F.

The vulcanizates were then tested and the physical properties thereof were determined as set forth in Table III (the heat build-up being determined with the Goodrich Flexometer in this table and in Table VI):

TABLE III

| Example No. | Dilution (water, liter) | Hardness (Shore A) | Modules (300%, p.s.i.) | Tensile (Ult., p.s.i.) | Elong. (percent) | Heat Build-Up ($\Delta H$, ° C.) |
|---|---|---|---|---|---|---|
| 1-A | 63/78 | 55 | 480 | 3,740 | 750 | 38 |
| 1-B | 63/78 | 56 | 500 | 3,770 | 720 | 40 |
| 2-A | 63 | 63 | 920 | 3,130 | 620 | 41 |
| 2-B | 63 | 58 | 915 | 3,150 | 615 | 50 |
| 3-A | 78 | 65 | 660 | 3,810 | 700 | 53 |
| 3-B | 78 | 63 | 730 | 3,870 | 680 | 56 |

From these physical test results it is apparent that the silica of the present invention as exemplified in Example 1, whether treated with aluminun sulfate (Example 1–A) or with sulfuric acid (Example 1–B) yielded in the vulcanizate a better balance of physical properties, and especially a lower heat build up, than the silicas of the comparative examples similarly treated and compounded.

*Example 4*

This example was made in a manner exactly like Example 1 except that 1 liter of water containing 292 g. (5 moles) of sodium chloride was added initially to the 14,065 grams (20 moles $Na_2O/(SiO_2)_{3.22}$) of commercial 41° Bé. sodium silicate dissolved in 62 liters of water. After the sodium chloride electrolyte and the dilute sodium silicate solutions were thoroughly mixed, the reactor was heated to 80° C. and while maintaining the reactor contents at 80° C. carbon dioxide was introduced. The carbon dioxide was introduced at a relative constant rate and after 135 minutes 5.1 moles of carbon dioxide had been added and the solution took on the blue color of the Tyndall effect. At this time 15 liters of water were added and the acidification with carbon dioxide continued. The acidulation rates are set forth in Table IV hereafter.

TABLE IV.—ACIDULATION OF SODIUM SILICATE WITH CARBON DIOXIDE

| Time, minutes (Cumulative) | $CO_2$, moles (Cumulative) | Acidulation, percent (Cumulative) |
|---|---|---|
| 0 | 0 | 0 |
| 135 | 5.1 | ¹ 25.6 |
| 645 | 18.4 | 92.6 |
| 675 | 23.8 | 119 |

¹ Tyndall effect noticable and added 15 liters of 80° C. water.

After termination of the acidulation the silica slurry was filtered and washed until the soluble salts were less than 1% dry basis.

Two portions of the silica slurry were treated as in Example 1; one portion being acidified to a pH of 4.5 with 10% aluminum sulfate and the silica product filtered, washed, dried and micropulverized and designated as silica 4-A and the other portion being acidified to a pH of 4.0 with 10% sulfuric acid and the silica product, filtered, washed, dried and micropulverized designated as 4-B.

*Example 5*

In this example 292 g. (5 moles) of sodium chloride were dissolved in 1 liter of water and mixed with 14,065 grams (20 moles $Na_2O/(SiO_2)_{3.22}$) of commercial 41° Bé. sodium silicate dissolved in 77 liters of water. The dilute sodium silicate solution containing the sodium chloride was heated to 80° C. and acidulated with $CO_2$ while agitating. The acidulation of the sodium silicate was carried on until the blue color of the Tyndall effect was noticable and then 10 liters of water were added and the acidulation continued until the silica precipitate had substantially formed and a further 10 liters of water added and the acidulation continued. The acidulation rates are set forth in Table V hereafter.

TABLE V.—ACIDULATION OF SODIUM SILICATE WITH CARBON DIOXIDE

| Time, minutes (Cumulative) | CO$_2$, moles (Cumulative) | Acidulation, percent (Cumulative) |
|---|---|---|
| 0 | 0 | 0 |
| 150 | 4.8 | [1] 24 |
| 285 | 8.1 | [2] 40.7 |
| 420 | 21.6 | 108.2 |

[1] Tyndall effect noticeable and added 10 liters of 80° C. water.
[2] Substantial precipitate formed and added 10 liters of 80° C. water.

A sample of the silica of this illustrative example which had been washed as in Example 1, and then acidified to a pH of 4.0 with 10% sulfuric acid and filtered, washed, dried and micropulverized, was designated silica 5–B.

*Example 6 (comparative example)*

This comparative example was prepared like Example 4 except that the addition of water during the acidification in accordance with this invention was omitted. Thus an amount of 292 g. (5 moles) of sodium chloride in 1 liter of water was added to 14,065 grams (20 moles Na$_2$O/(SiO$_2$)$_{3.22}$) of commercial 41° Bé. sodium silicate dissolved in 62 liters of water. After the sodium chloride electrolyte and the dilute sodium silicate solutions were thoroughly mixed, the reactor was heated to 80° C. and while maintaining the reactor contents at 80° C. carbon dioxide was introduced. The carbon dioxide was introduced at a relative constant rate and after 615 minutes 25.1 moles of carbon dioxide had been absorbed and the reaction was terminated.

Upon termination of the acidulation the silica slurry was filtered and washed until the soluble salts were less than 1% dry basis.

A portion of the washed silica slurry was treated with 10% aluminum sulfate until a pH of 4.5 was reached and the product was filtered, washed, dried, micropulverized and designated 6–A.

Another portion of the washed silica slurry was treated with 10% sulfuric acid until a pH of 4.0 was reached and the product was filtered, washed, dried and micropulverized and designated 6–B.

*Example 7 (comparative example)*

This comparative example was prepared like Example 5 except that the additions of water during the acidification in accordance with the present invention were omitted.

Thus, a solution was prepared of 292 grams of sodium chloride and 14,065 grams (20 moles Na$_2$O/(SiO$_2$)$_{3.22}$) of commercial 41° Bé. sodium silicate dissolved in 78 liters of water and the solution was heated to 80° C. In a period of 205 minutes 24.8 moles of carbon dioxide were consumed during the acidulation.

The washing and after-treatment were as in Example 5, and the resulting silica pigment was designated 7–A.

The silicas of Examples 4–A, 4–B, 5–A, 6–A, 6–B, and 7–A, were compounded, aged, cured, and tested in the same manner as set forth in connection with those of Table III above, and showed the physical properties set forth in Table VI.

From a comparison of these physical test results it is apparent that the silicas of the present invention as prepared in Examples 4 and 5 imparted to vulcanizates better tensile strength values with substantially no increase in heat build-up, as compared with the silicas prepared in the comparative Examples 6 and 7 similarly treated and compounded.

From the examples given it will be appreciated that in the broader aspects of the invention the water may be added (a) all at one time on the appearance of a Tyndall effect, or (b) all at one time after precipitation has commenced, or (c) in a plurality of portions e.g. partly when the Tyndall effect occurs and partly when substantial precipitation has occurred, or (d) at selected periods after the acidulation and building of the ultimate particles has progressed substantially, i.e. after $x$ has reached a value of 3.75. The addition of the water all at one time, or in relatively few portions each correllated with the $x$-value of the solution is preferred for simplicity, but the addition may be made more or less rapidly, over correspondingly more or less extended periods of time, so long as such additions are correllated with the stages of acidulation in a manner to influence the network particle size and/or the size of floc of the pigment relative to the primary particle size thereof. It is also to be understood that the present invention can be employed concurrently with the variation of other conditions of the acidulation to obtain the advantages of the present invention combined with those of other product characteristic controlling procedures.

The silica pigments contemplated herein are at least for the most part comprised of silica. They usually comprise a few percent of free water removable by heating at 105° C. and a few percent of bound water removable by heating at over 1000° C. They may contain a small amount of bound alkali. They may also contain a small amount of metal in the form of oxide, hydroxide, silicate or other salts, especially metal of the group consisting of magnesium, calcium, barium, zinc and aluminum. These and other metallo-ingredients of the silica pigments may be introduced, for example, as described in Burke et al., U.S. Patent No. 3,178,388 dated April 13, 1965 and in copending Burke et al. application Ser. No. 422,455, filed December 30, 1964. Thus the term silica pigment contemplates not only the pigments comprised solely of SiO$_2$ but also the silicious pigments containing proportions of other constituents as just described.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalents of the claims are intended to be included therein.

I claim:

1. In the preparation of silica pigment by the acidulation of an aqueous solution of alkali metal silicate with the aid of carbon dioxide, the improvement which comprises adding water essentially free of electrolyte to the solution during that part of the period in the acidulation thereof in which the value of $x$ in the composition of

TABLE VI

| Example No. | Dilution (water, liter) | Hardness (Shore A) | Modules (300%, p.s.i.) | Tensile (Ult., p.s.i.) | Elong. (percent) | Heat Build-Up ($\Delta H$, ° C.) |
|---|---|---|---|---|---|---|
| 4–A | 63/78 | 58 | 710 | 3,540 | 740 | 44 |
| 4–B | 63/78 | 58 | 820 | 3,300 | 580 | 44 |
| 5–A | 78/88/98 | 56 | 700 | 3,710 | 690 | 39 |
| 6–A | 63 | 55 | 775 | 2,065 | 610 | 43 |
| 6–B | 63 | 55 | 970 | 2,210 | 595 | 39 |
| 7–A | 78 | 66 | 825 | 3,005 | 600 | 47 | the alkali metal silicate designated by the formula $M_2O(SiO_2)_x$—wherein M is alkali metal—has become greater than 3.75; said water being added in the proportion of from 10 parts to 150 parts per 100 parts of water present just prior to such addition.

2. In the preparation of silica pigment by the acidulation of an aqueous solution of alkali metal silicate with the aid of carbon dioxide, the improvement which comprises adding water essentially free of electrolyte to the solution during that part of the period in which the acidulation thereof in which the value of $x$ in the composition of the alkali metal silicate designated by the formula $M_2O(SiO_2)_x$—wherein M is alkali metal—has become greater than 4.2; said water being added in the proportions of from 10 parts to 150 parts per 100 parts of water present prior to such addition.

3. In the preparation of silica pigment by the acidulation of an aqueous solution of alkali metal silicate with the aid of carbon dioxide, the improvement which comprises adding water essentially free of electrolyte to the solution during that part of the period in the acidulation thereof in which the precipitation of the silica has become substantially complete; said water being added in the proportion of from 10 parts to 150 parts per 100 parts of water present prior to such addition.

4. The invention of claim 1, wherein the addition of water essentially free of electrolyte is terminated before the value of $x$ reaches 5.3.

5. The invention of claim 1, wherein the addition of water essentially free of electrolyte is terminated on the appearance of a Tyndall effect.

6. The invention of claim 1, wherein the addition of water essentially free of electrolyte is terminated when the precipitation of the silica has become substantially complete.

7. The invention of claim 2, wherein the addition of water essentially free of electrolyte is initiated on the appearance of a Tyndall effect.

8. The invention of claim 7, wherein the addition of water essentially free of electrolyte is terminated when the precipitation of the silica has become substantially complete.

9. The invention of claim 2, wherein a portion of said water essentially free of electrolyte is added upon the appearance of a Tyndall effect and another portion of said water essentially free of electrolyte is added after the precipitation of the silica commences.

10. The invention of claim 1, practiced as a continuous process wherein the acidulation is applied to moieties of the alkali metal silicate solution in a series of zones, and the addition of water essentially free of electrolyte is effected in less than all of said zones.

11. The invention of claim 2, practiced as a continuous process wherein the acidulation is applied to moieties of the alkali metal silicate solution in a series of zones, and the addition of water essentially free of electrolyte is effected in less than all of said zones.

12. The invention of claim 3, practiced as a continuous process wherein the acidulation is applied to moieties of the alkali metal silicate solution in a series of zones, and the addition of water essentially free of electrolyte is effected in less than all of said zones.

References Cited by the Examiner

UNITED STATES PATENTS

| | | | |
|---|---|---|---|
| 2,601,235 | 6/1952 | Alexander et al. | 23—182 |
| 2,940,830 | 6/1960 | Thornhill | 23—182 |
| 3,250,594 | 5/1966 | Burke et al. | 23—182 |

OSCAR R. VERTIZ, *Primary Examiner.*

A. GRIEF, *Assistant Examiner.*